US008760585B2

(12) United States Patent
Fay

(10) Patent No.: US 8,760,585 B2
(45) Date of Patent: Jun. 24, 2014

(54) NESTED SYMBOL CONSTELLATIONS REPRESENTING RESPECTIVE SERVICES FOR GRACEFUL DEGRADATION IN THE PRESENCE OF NOISE

(75) Inventor: Luke Vernor Fay, San Diego, CA (US)

(73) Assignee: Sony Corporation, Tokyo (JP)

( * ) Notice: Subject to any disclaimer, the term of this patent is extended or adjusted under 35 U.S.C. 154(b) by 183 days.

(21) Appl. No.: 13/473,843

(22) Filed: May 17, 2012

(65) Prior Publication Data

US 2013/0308060 A1 Nov. 21, 2013

(51) Int. Cl.
*H04N 5/455* (2006.01)
*H04N 5/44* (2011.01)

(52) U.S. Cl.
USPC ............................. 348/726; 348/725

(58) Field of Classification Search
CPC ....... H04N 5/44543; H04N 5/60; H04N 5/62; H04N 5/4401; H04N 5/44; H04N 5/455; H04N 5/50; H04N 11/146; H04N 21/435; H04L 27/2647; H04L 27/06; H04L 27/38; H04L 27/3809
USPC .......... 348/725–729, 738, 731–733; 725/100, 725/131, 139, 151; 375/316, 320, 340
IPC .............................. H04N 5/44, 5/455, 5/50, 5/60
See application file for complete search history.

(56) References Cited

U.S. PATENT DOCUMENTS

| 5,321,725 | A  | * | 6/1994 | Paik et al. ..................... 375/265 |
| 8,503,580 | B2 | * | 8/2013 | Khayrallah ................... 375/340 |
| 2004/0081251 | A1 | * | 4/2004 | Kons ............................ 375/265 |

FOREIGN PATENT DOCUMENTS

EP 0732832 3/1996

OTHER PUBLICATIONS

Masafumi Saito, Shigeki Moriyama, Osamu Yamada, "A Digital Modulation Method for Terrestrial Digital TV Broadcasting Using Trellis Coded OFDM and Its Performance" http://ieeexplore.ieee.org/xpl/articleDetails.jsp?arnumber=276674 &contentType=Conference+Publications, Dec. 6-9, 1992.

* cited by examiner

*Primary Examiner* — Sherrie Hsia
(74) *Attorney, Agent, or Firm* — John L. Rogitz

(57) ABSTRACT

Symbols representing different classes of service are assigned to different modulation schemes so that the most important service (e.g., emergency messaging) can have the most robust performance, the next important service (e.g., audio) can have robust performance and so on including various grades of video (e.g., HDTV, SDTV) becoming available with decent received RF signal power. The separate modulation constellation points can be scaled to fit inside popular square constellation points to aide receiver synchronization. In this way, graceful degradation of service is afforded in the presence of noise in the channel.

12 Claims, 6 Drawing Sheets

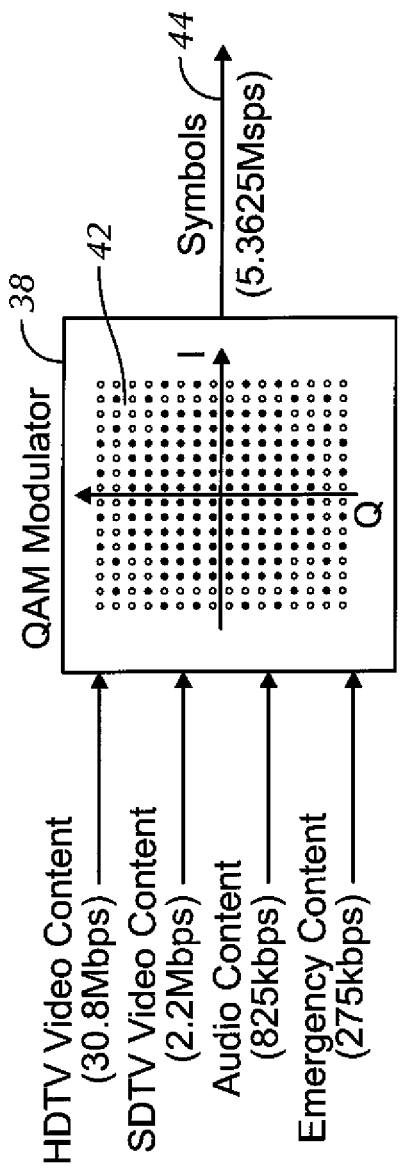

HDTV Video has 128 symbols out of 256
→ 8.8 * 128/256 = 4.4Msps
→ 7bits/symbol yields 30.8Mbps
SDTV Video has 128 symbols out of 256
→ 8.8 * 16/256 = 0.55Msps
→ 4bits/symbol yields 2.2Mbps
Audio has 128 symbols out of 256
→ 8.8 * 8/256 = 0.275Msps
→ 3bits/symbol yields 825kbps
Emergency has 4 symbols out of 256
→ 8.8 * 4/256 = 0.1375Msps
→ 2bits/symbol yields 275kbps

Example:
256 QAM has 8bit symbols
Channel = 6MHz raster
Excess BW ~ 0.12 roll-off
Symbol rate ~ 5.360537Msps
156 symbols used in constellation
(100 are blank)
So, scale symbol rate accordingly
5.360537 / (156/256) = 8.7967786666Msps
→ round to 8.8Msps

FIG. 3

Example HDTV
128 QAM Mapping

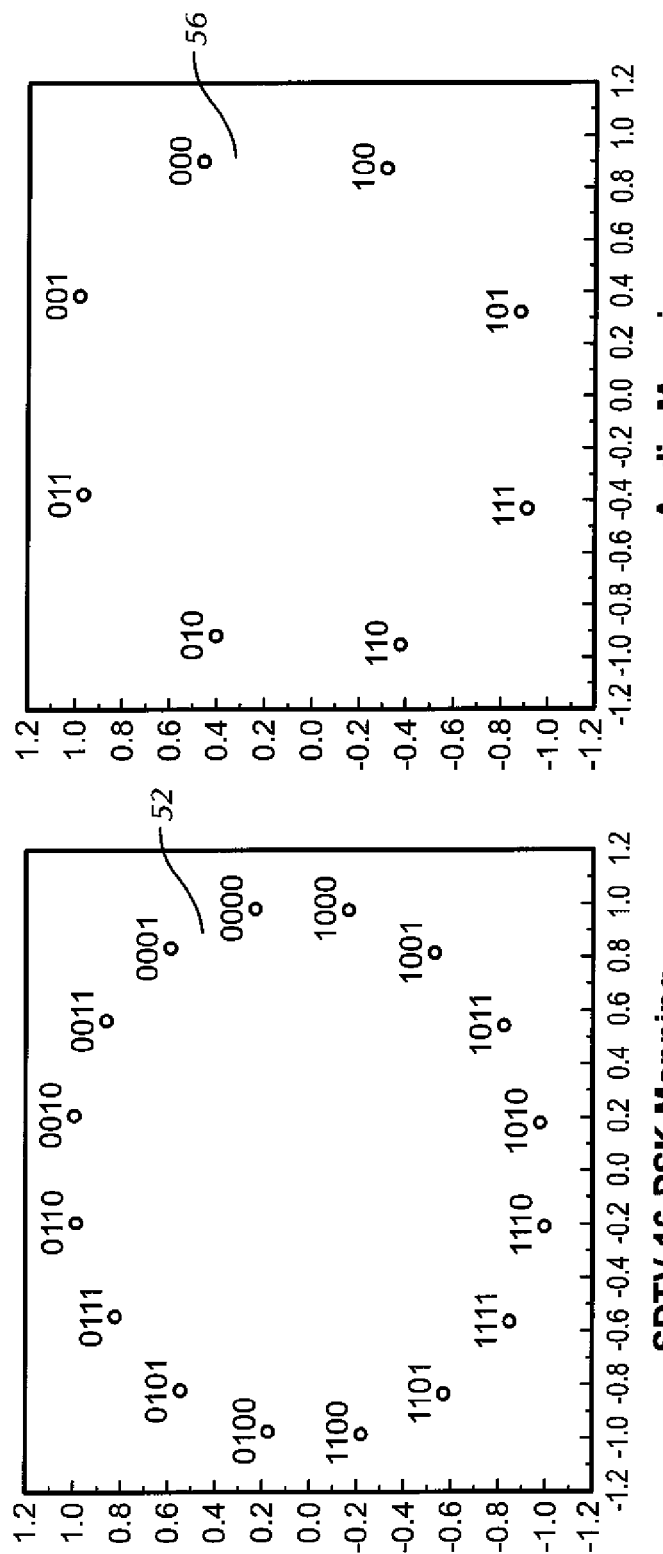
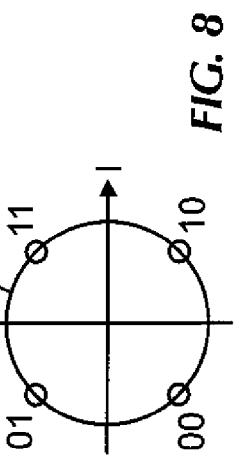
FIG. 6
FIG. 7
FIG. 8

Transmitter Logic

Sink Logic

NESTED SYMBOL CONSTELLATIONS REPRESENTING RESPECTIVE SERVICES FOR GRACEFUL DEGRADATION IN THE PRESENCE OF NOISE

FIELD OF THE INVENTION

The present application relates generally to nested symbol constellations representing respective services for providing a graceful degradation of audio video presentation in the presence of noise.

BACKGROUND OF THE INVENTION

Digital television has a cliff-effect where either the entire service is received or none of the service is received. This is the effect of a forward error correction (FEC) operation used in digital demodulation. Old analog televisions had picture quality depend on received RF signal strength. Digital television currently cannot offer this service of graceful degradation in picture quality. The concept set forth herein returns this graceful performance degradation to digital television.

Quadrature amplitude modulation (QAM) is a technique which conveys data by changing some aspect of a carrier signal (symbol) in response to a data signal. In the case of QAM, the amplitude of two waves, ninety degrees out-of-phase with each other (in quadrature) are modulated or keyed to represent the data signal. In QAM, symbols representing N-bits of data are mapped to predetermined locations in a constellation of $2^N$ points, with each point in the constellation being reserved for a respective symbol representing a particular binary sequence of data bits. With this understanding and the issue of graceful degradation of service mentioned above in mind, present principles are provided.

SUMMARY OF THE INVENTION

Present principles envision that in the presence of sufficient noise in, e.g., a digital TV signal which otherwise could result in snowy pictures, High Definition (HD) video can gracefully degrade to Standard Definition (SD) video, and if sufficient noise exists, to audio only service, and if still further noise exists, to providing only auxiliary services such as emergency broadcast services. Present principles thus apply to either Orthogonal Frequency Division Multiplexing (OFDM) modulation and Single Suppressed Carrier (SSC) types of modulation techniques, both of which use constellation mappers.

As set forth further below, in one implementation the most important service (emergency signaling) is assigned to outlying points of a symbol constellation, points (quadrature phase shift keying (QPSK)-like points in a modulation). These QPSK outliers also would have the lowest bit-rate available. Then audio is mapped to inner points (PSK-like points within the constellation) to give large Hamming/Euclidean distances between points for a strong audio service. Finally, SDTV information is applied to a lower order Quadrature Amplitude Modulation (QAM) points or to higher order Phase Shift Keying (PSK) points, and HDTV is applied to the highest order QAM points in a constellation.

Alternatively to the above-summarized constellation mapping, hierarchical transmission power is employed in which more power is allocated to selected symbols than to others, e.g., highest power to emergency signals, next highest to audio, next highest to SD video, and next highest to HD video. In this way the sink can recover at least a portion of the received Radio Frequency (RF) signal for basic operation of a few key services. As mentioned above, most important would be for emergency signals, then audio, then video service. Consequently, as the RF signal strength gets weaker, only the stronger modulated services remain.

Thus, it may now be appreciated that present principles employ respective modulation techniques for respective services within a single RF signal to allow a receiver to have graceful degradation of video/audio service. When a sink obtains very low RF signal strength, it has the potential to still recover the most important information (emergency). As the RF signal strength increases, the signal to noise ratio (SNR) increases and the sink can discern 8 PSK type constellations and audio becomes available. As the RF signal strength keeps increasing, SDTV can be demodulated and presented, and eventually HDTV.

Accordingly, a source of audio video data including HD video data, SD video data, audio data, and auxiliary data includes a processor and a modulator assembly including a QAM configured to receive data symbols from the processor. The data symbols represent HD video data, SD video data, audio data, and auxiliary data. The modulator assembly is configured to map symbols representing the auxiliary data to a first region of a symbol constellation, and to map symbols representing the audio data to a second region of the symbol constellation. The modulator assembly also maps symbols representing the SD video data to a third region of the symbol constellation and maps symbols representing the HD video data to a fourth region of the symbol constellation. The first region of the constellation is more robust to noise than the second region, the second region in turn is more robust to noise than the third region, and the third region in turn is more robust to noise than the fourth region.

In example embodiments the first region is characterized by a first Hamming distance and the second region is characterized by a second Hamming distance less than the first Hamming distance. The third region can be characterized by a third Hamming distance and the second Hamming distance can be greater than the third Hamming distance. Likewise, the fourth region can be characterized by a fourth Hamming distance and the third Hamming distance may be greater than the fourth Hamming distance.

In some implementations the fourth region is 128 QAM region, the third region is a 16-PSK region, the second region is an 8-PSK region, and the first region is a Differential Quadrature (DQ) PSK region.

In another aspect, a method includes assigning multiple services to respective modulation techniques, and sending the services to a sink within a single RF signal to allow the sink to have graceful degradation of video/audio service.

In another aspect, an Audio Video Display Device (AVDD) has a processor, a video display configured for presenting demanded images under control of the processor, and a speaker configured for presenting demanded audio under control of the processor. A QAM demodulator is configured for receiving signals, demodulating the signals to render symbols, and providing the symbols to the processor. The symbols represent HD video data, SD video data, audio data, and auxiliary data. A computer readable storage medium bearing instructions is executable by the processor. The AVDD presents at least HD video data and audio data responsive to the signals being characterized by a high quality metric, and presents at least SD video data and audio data responsive to the signals being characterized by a next highest quality metric but not the high quality metric. Also, the AVDD presents audio but no video responsive to the signals being characterized by a low quality metric but not the next highest quality metric.

The details of the present invention, both as to its structure and operation, can be best understood in reference to the accompanying drawings, in which like reference numerals refer to like parts, and in which:

BRIEF DESCRIPTION OF THE DRAWINGS

FIG. 3 is a block diagram of an example quadrature amplitude modulation (QAM) modulator used by the source to modulate high definition (HD) video data, standard definition (SD) video data, audio data, and auxiliary data such as emergency messages using a QAM mapping;

FIG. 6 is a schematic diagram showing an example 16-phase shift keying (PSK) mapping for the SD video constellation;

FIG. 7 is a schematic diagram showing an example 8-PSK mapping for the audio constellation;

FIG. 8 is a schematic diagram showing an example differential quadrature (DQ) PSK mapping for the auxiliary constellation;

DETAILED DESCRIPTION OF THE PREFERRED EMBODIMENT

Figure 1:
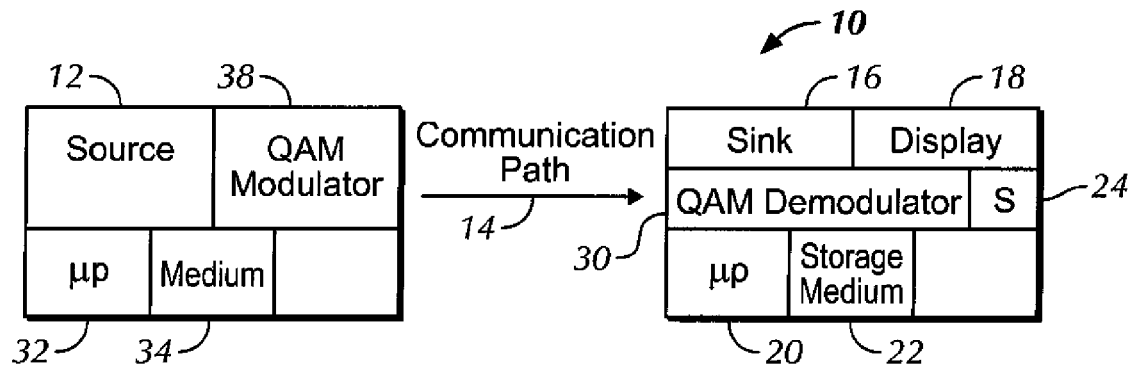
FIG. 1 is a block diagram showing an example source and sink that can use the nested symbol constellations herein.

Referring initially to FIG. 1, a system 10 is shown in which a source 12 of audio video programming communicates, over a wired or wireless communications path 14, audio video data to a player of content, referred to herein as a "sink" 16, such as but not limited to a high definition (HD) TV with a HD display 18 controlled by a sink processor 20 accessing a computer readable storage medium 22 such as disk-based or solid state storage. The medium 22 may be local memory used by the sink processor 20 to undertake present principles on the sink side. The sink processor 20 also controls one or more audio speakers 24. For audio video reception, the processor 20 uses a demodulator assembly 30 which may include a QAM demodulator to demodulate audio and video data received over the communication path 14. Note that the demodulator assembly 30 may include plural, separate demodulators respectively associated with a service (HDTV, SDTV, audio, and auxiliary) that can synchronize and lock onto respective signals to demodulate the respective symbols. In some embodiments the HD video demodulator is a 128-QAM demodulator, the SD video demodulator is a 16-PSK demodulator, the audio demodulator is an 8-PSK demodulator, and the auxiliary data demodulator is a DPSK demodulator. Thus, by separating out services in a symbol constellation, the broadcaster can choose robustness for each service. QPSK can tolerate higher noise than 128-QAM, so when the received RF Signal Power is poor (e.g., too low to demodulate 128-QAM), the QPSK service can still be demodulated.

Similarly, the source 12, which may be a broadcast TV signal source or other source of audio video programming, includes a source processor 32 accessing a computer readable storage medium 34 such as disk-based or solid state storage. The medium 34 may be local memory used by the source processor 32 to undertake present principles on the source side. For audio video transmission, the source processor 32 uses a modulator assembly 38 that can include a QAM modulator to modulate HD video, a 16-PSK modulator to modulate SD vide, an 8-PSK modulator to modulate audio, and a DPSK modulator to modulate auxiliary data such as emergency messages. Note that the modulator assembly may include a summing or combining component to combine the outputs of the modulators into the symbol constellation and example of which is shown and described below. Using the constellation audio and video data are sent over the communication path 14.

Figure 2:
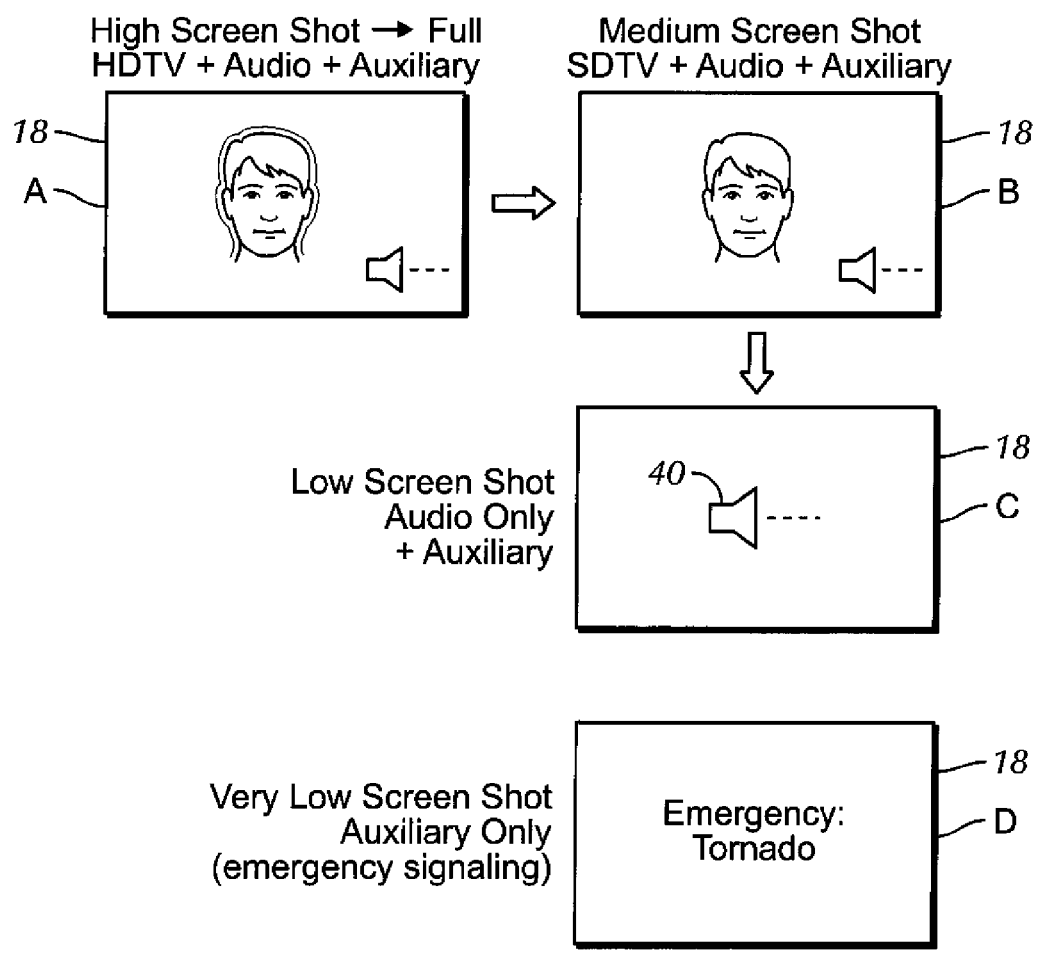
FIG. 2 is a series of screen shots at the sink illustrating the graceful degradation of data presentation afforded by present principles.

FIG. 2 shows a series of screen shots of the sink display 18 illustrating present graceful degradation principles. Screen shot D shows that when the sink 16 obtains very low RF signal strength, it has the potential to still recover and present the most important information, in this case, a textual emergency message. As the RF signal strength increases, the signal to noise ratio (SNR) increases and the sink can discern sufficient signal to make audio display possible, as shown in screen shot C, in which a speaker icon 40 indicates that audio is output on the speaker 24 but no video is yet discernable from the relatively low strength signal. As the RF signal strength keeps increasing, screen shot B illustrates that standard definition TV (SDTV) can be demodulated and presented, and eventually, as the signal becomes strong, HDTV can be presented as shown in screen shot A.

FIG. 3 shows further details of the QAM modulator 38, in which HDTV video content, SDTV video content, audio content, and emergency message content are mapped into a symbol constellation 40 defining I and Q axes to output symbols at 44. The bit rates, frequencies, symbol rates, and number of symbols shown in FIG. 3 are self-explanatory and are for illustration only. Note that the example constellation is a 256 QAM constellation with 256 constellation points, one point each into which a respective one of every possible combination of 8-bit symbols can be uniquely mapped. Note further that the non-limiting example discussed herein assumes that HDTV will use N=7 bit symbols, thus consuming only 128 constellation points, SDTV uses N=4 bit symbols, thus requiring only sixteen constellation points, audio uses N=3 bit symbols, requiring eight constellation points, and emergency messaging requires N=2 bit symbols, requiring four constellation points, leaving one hundred of the 256 possible points in an N=8 256-QAM constellation unused. The symbol rates are scaled accordingly.

Figure 4:
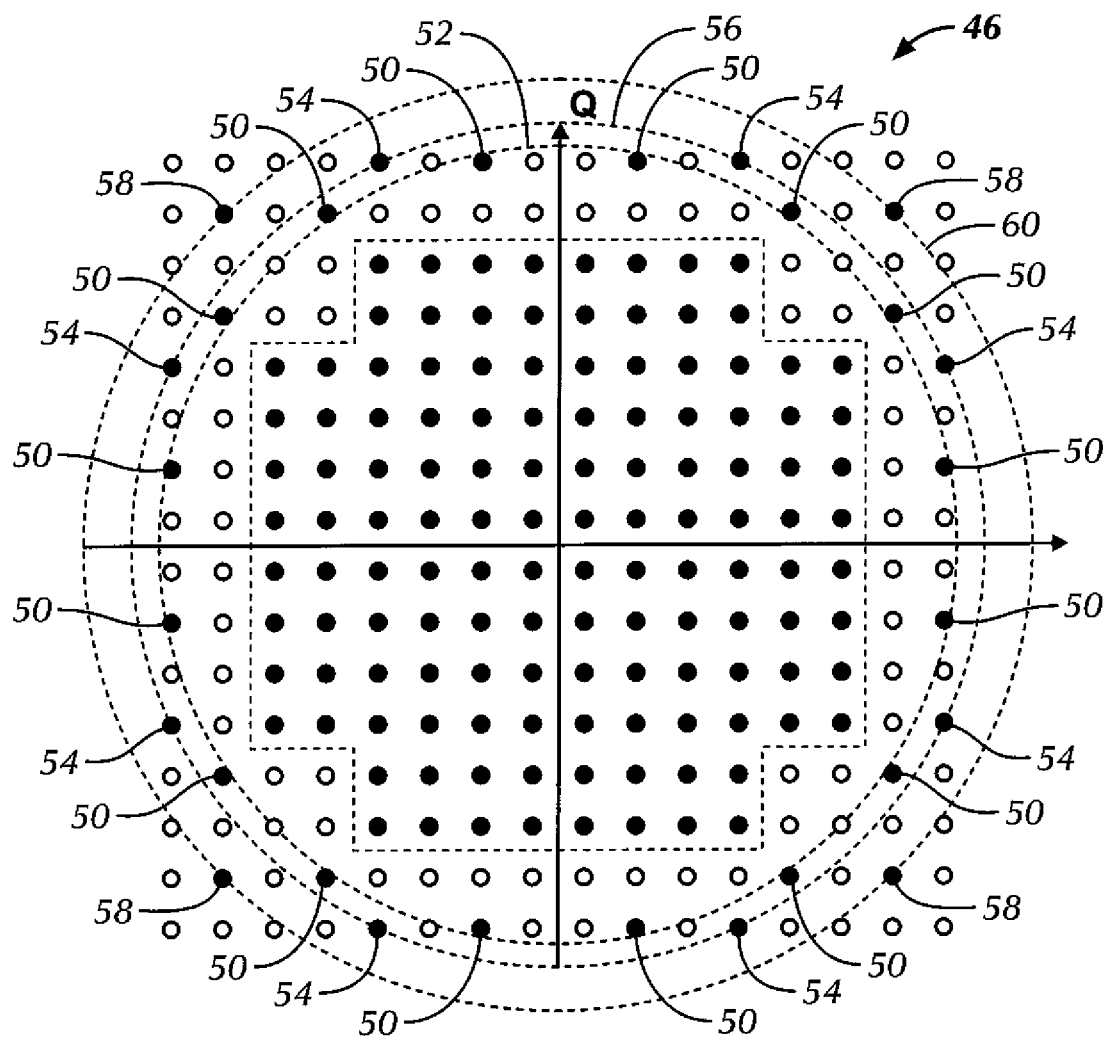
FIG. 4 is a schematic diagram showing the nested constellations for HD video, SD video, audio, and auxiliary data.

FIG. 4 illustrates further details of a 256-QAM constellation, labeled 46 in FIG. 4. The 128 points within region enclosed by the dashed line 48 are reserved for HDTV symbols. Note that the Hamming distance between adjacent points in this region is relatively small and, hence, relatively sensitive to the effects of noise reducing the signal to noise ratio (SNR). 16-DPSK points 50 that are in an outer region of the constellation generally defined by a ring 52 are reserved for 4-bit SDTV symbols, and 8-PSK points 54 for audio are in yet a further outer region generally defined by the ring 56. Furthest out in the constellation are four DQPSK symbols 58 in an outermost ring 60. Each successively outer region has a larger Hamming distance between points than the adjacent inner region and thus is more robust to noise than the immediately adjacent inner region.

Figure 5:
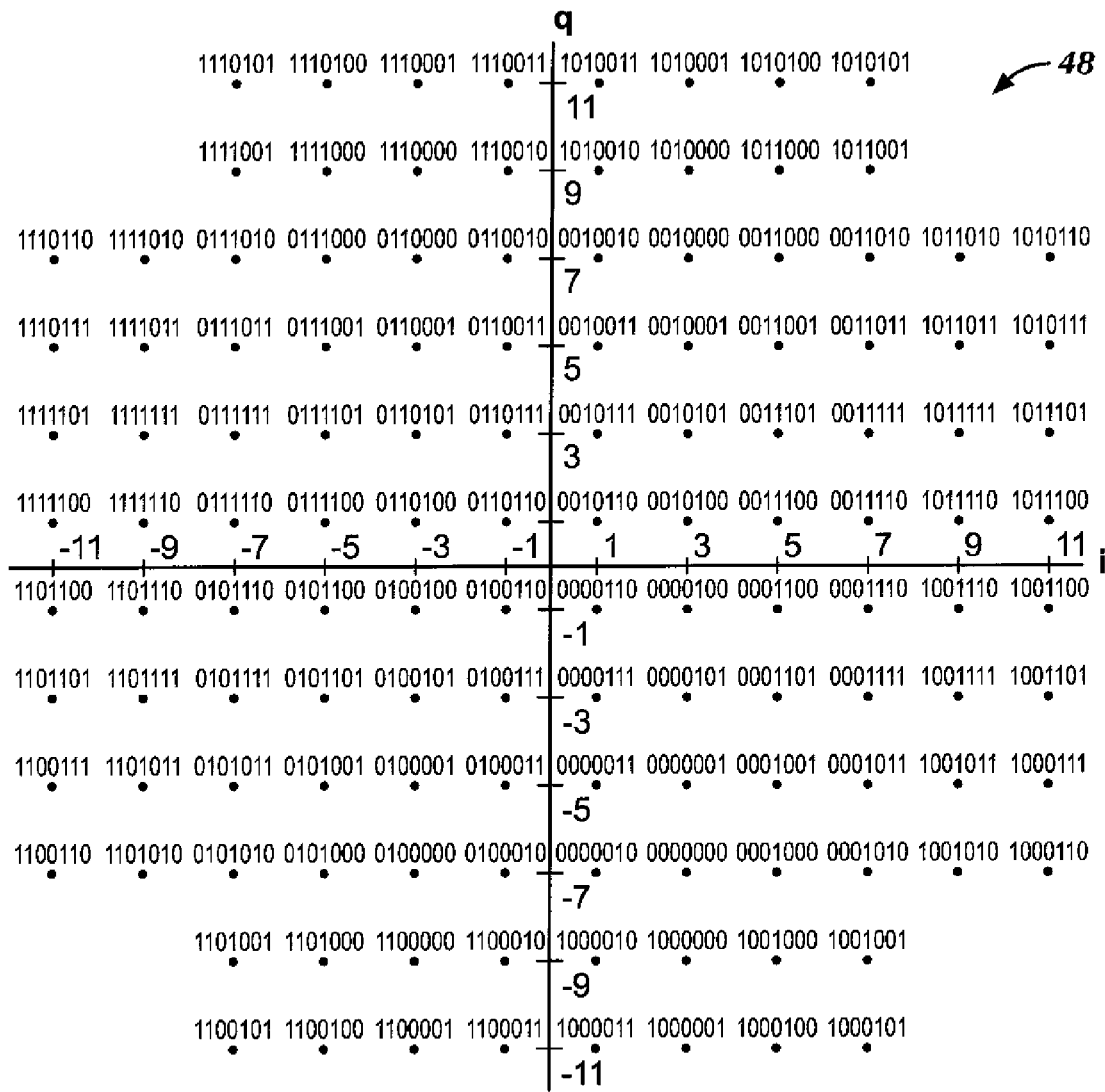
FIG. 5 is a schematic diagram showing an example 128 QAM mapping for the HD video constellation.

FIG. 5 illustrates an example symbol mapping for each of the 128 HDTV points in the 128-QAM region 48 shown in FIG. 4, while FIGS. 6-8 respectively illustrate example symbol mapping for the SDTV symbol region 52, audio symbol region 56, and emergency messaging symbol region 60 shown in FIG. 4.

Figure 9:
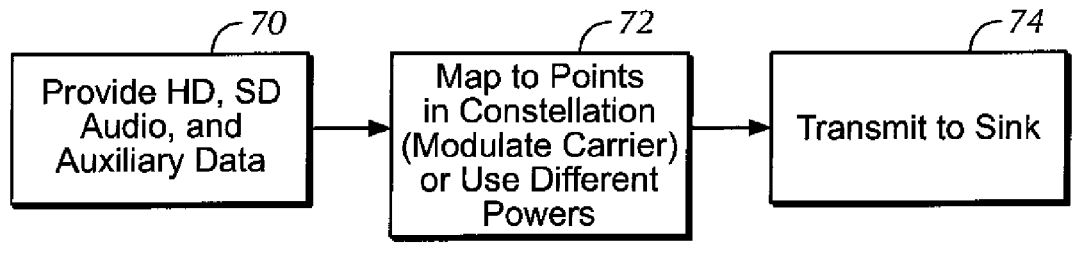
FIG. 9 is a flow chart showing example source logic.

FIG. 9 shows example logic that is executed at the source (or transmitter). Commencing at block 70, HDTV video, SDTV video, audio, and auxiliary data, such as emergency messages, if any, are provided and at block 72 mapped into a symbol constellation such as the ones described above. The symbols modulate the carrier wave, which is transmitted to the sink at block 75. Alternatively, the symbol groups are transmitted with respective power levels, from highest to lowest: auxiliary symbols, audio symbols, SD video symbols, then HD video symbols.

Figure 10:
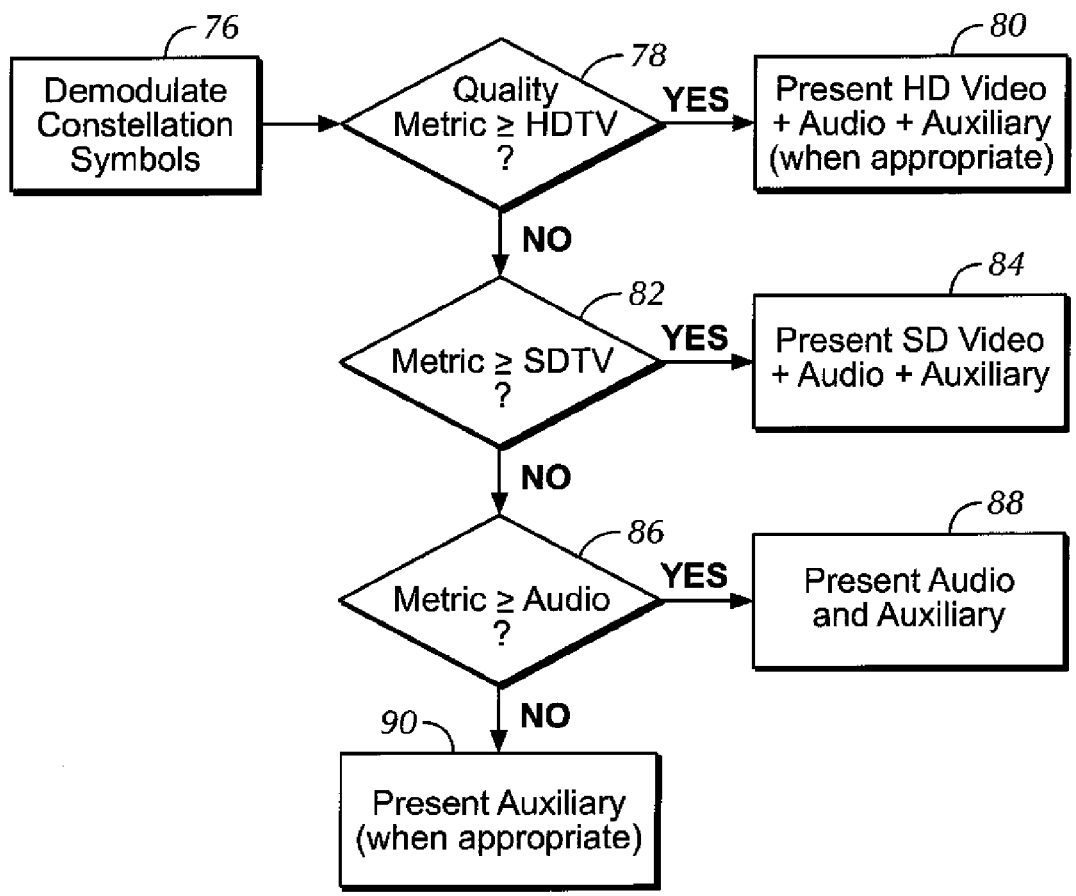
FIG. 10 is a flow chart showing example sink logic.

FIG. 10 shows processing by the sink. Note that while the discussion below for clarity assumes determinations as to signal quality are being made, in implementation the determinations may be made implicitly, i.e., if the HDTV 128-QAM demodulator in the demodulator assembly 30 cannot synchronize with and lock onto the symbols in its respective service portion of the constellation, but the 16-PSK SDTV demodulator in the assembly can synchronize with and lock onto the symbols in its respective service portion of the constellation, then a determination (in this case, a positive result at decision diamond 82, below) has been implicitly made.

The symbols received from the source are demodulated at block 76 and then, responsive to a determination that a quality metric of the received signal satisfies a HDTV threshold, HD video, audio, and when provided auxiliary information are presented on the sink at block 80. When power is used to differentiate among symbol groups, the quality metric may be received power or number of error-free packets in a service, etc. When constellation position is used to differentiate among symbol groups, the quality metric may be SNR or bit error rate (BER) or other appropriate metric. In any case, the HDTV threshold is the least robust to noise and in effect requires the best signal reception of the other thresholds discussed below.

On the other hand, decision diamond 82 indicates that responsive to a determination that the quality metric of the received signal falls between the HDTV threshold and an SDTV threshold, SD video, audio, and when provided auxiliary information are presented on the sink at block 84. Yet again, decision diamond 86 indicates that responsive to a determination that the quality metric of the received signal falls between the SDTV threshold and an audio threshold, only audio, and, when provided, auxiliary information are presented on the sink at block 88. No video is presented. Finally, a determination that the quality metric of the received signal falls below the audio threshold, at block 90 only auxiliary information, when provided, is presented on the sink.

Radio signals, wireless communications of any kind for which graceful performance degradation is desired can employ present principles. In cities with many buildings or with spotty service within a coverage area, present principles can be used to ensure operation within a coverage area. Present principles primarily apply to digital communication services.

While the particular NESTED SYMBOL CONSTELLATIONS REPRESENTING RESPECTIVE SERVICES FOR GRACEFUL DEGRADATION IN THE PRESENCE OF NOISE is herein shown and described in detail, it is to be understood that the subject matter which is encompassed by the present invention is limited only by the claims.

What is claimed is:

1. Audio video display device (AVDD) comprising:
   processor configured for presenting demanded images on a video display;
   demodulator assembly including a quadrature amplitude modulation (QAM) demodulator configured for receiving signals, demodulating the signals to render symbols, and providing the symbols to the processor, the symbols representing high definition (HD) video data, standard definition (SD) video data, audio data, and auxiliary data; and
   computer readable storage medium bearing instructions executable by the processor to;
   present at least HD video data and audio data responsive to the signals being characterized by a high quality metric;
   present at least SD video data and audio data responsive to the signals being characterized by a next highest quality metric but not the high quality metric; and
   present audio but no video responsive to the signals being characterized by a low quality metric but not the next highest quality metric.

2. The AVDD of claim 1, wherein the AVDD is configured to:
   present no audio, no video, and only auxiliary data responsive to the signals being characterized by a lowest quality metric indicating lower quality than the low quality metric.

3. The AVDD of claim 1, wherein the high quality metric is a signal-to-noise ratio (SNR).

4. The AVDD of claim 1, wherein the high quality metric is a bit error rate (BER).

5. The AVDD of claim 1, wherein the high quality metric is a signal strength.

6. The AVDD of claim 1, wherein the symbols are received in a quadrature amplitude modulation (QAM) constellation.

7. Receiver of audio video data including high definition (HD) video data, standard definition (SD) video data, audio data, and auxiliary data, comprising:
   processor;
   demodulator assembly including a quadrature amplitude modulator (QAM) and being configured to send data symbols to the processor, the data symbols representing high definition (HD) video data, standard definition (SD) video data, audio data, and auxiliary data, the processor configured to:
   receive symbols representing the auxiliary data and mapped to a highly robust modulation technique (QPSK) with constellation points in a first region of a symbol constellation;
   receive symbols representing the audio data and mapped to a robust modulation technique (PSK) with constellation points in a second region of the symbol constellation;
   receive symbols representing the SD video data and mapped to a modulation technique (PSK) with constellation points in a third region of the symbol constellation;
   receive symbols representing the HD video data and mapped to a modulation technique (QAM) with constellation points in a fourth region of the symbol constellation; and
   output on at least one audio and/or video display audio and/or video data according to the symbols.

8. The receiver of claim 7, wherein the first region is characterized by a first Hamming distance and the second region is characterized by a second Hamming distance less than the first Hamming distance.

9. The receiver of claim 7, wherein the third region is characterized by a third Hamming distance and the second Hamming distance is greater than the third Hamming distance.

10. The receiver of claim 7, wherein the fourth region is characterized by a fourth Hamming distance and the third Hamming distance is greater than the fourth Hamming distance.

11. The receiver of claim 7, wherein the fourth region is 128 QAM region.

12. The receiver of claim 7, wherein the third region is a 16-phase shift keying (PSK) region.

* * * * *